May 13, 1969

H. E. HOBE 3,443,701

SCRAP CHARGING MACHINE

Filed Aug. 15, 1967

INVENTOR.
HAROLD E. HOBE
BY
Donald G. Dalton

ATTORNEY.

INVENTOR.
HAROLD E. HOBE
BY Donald G. Dalton
ATTORNEY.

United States Patent Office 3,443,701
Patented May 13, 1969

3,443,701
SCRAP CHARGING MACHINE
Harold E. Hobe, Johnstown, Pa., assignor to United States Steel Corporation, a corporation of Delaware
Filed Aug. 15, 1967, Ser. No. 660,727
Int. Cl. F23h *3/00;* B66c *17/08;* B60p *1/00*
U.S. Cl. 214—18                                    5 Claims

ABSTRACT OF THE DISCLOSURE

A machine for charging scrap into an open hearth furnace. Includes a car and a hopper on the car. Hopper has apron to project into furnace door, and a double-ram arrangement for pushing scrap from the hopper across the apron into the furnace.

---

This invention relates to an improved machine for charging scrap material into an open hearth furnace.

An object of the invention is to provide a compact charging machine of simple construction which can charge a large mass of solid material quickly into an open hearth furnace.

A further object is to provide an improved charging machine which effectively distributes material beyond the door of an open hearth furnace.

A further object is to provide a ram-type charging machine which embodies a double-ram arrangement mounted on a single car, thereby avoiding need for a second car and track.

Figure 6:
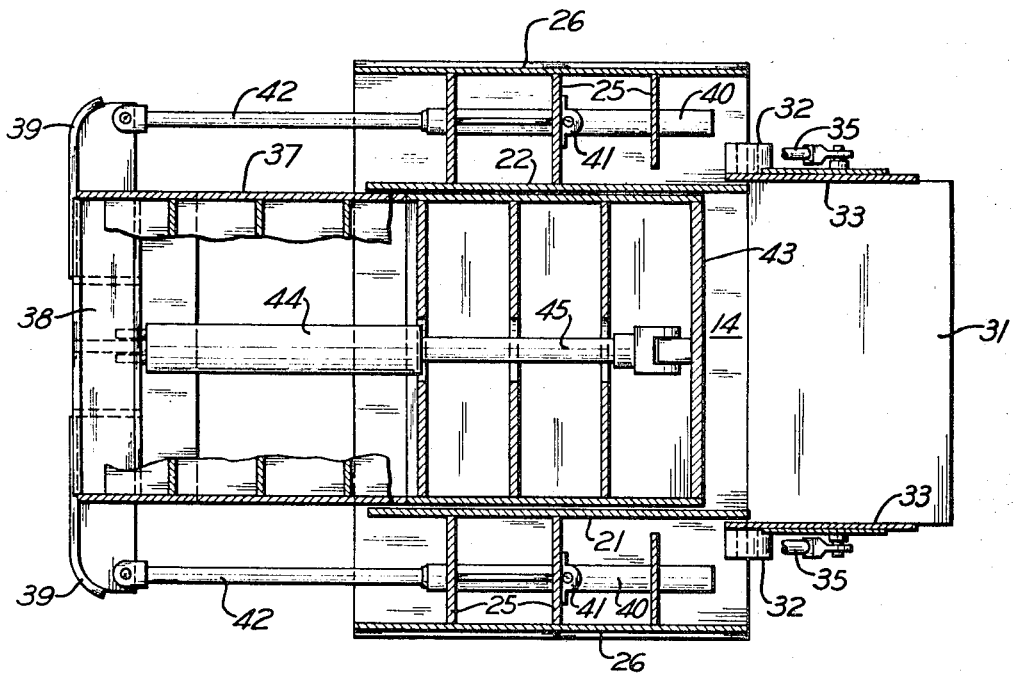
FIGURE 6 is a horizontal section on line VI—VI of FIGURE 4, the "steady rest" being omitted for clarity.

My charging machine includes a car formed of outer and intermediate lengthwise structural members 10 and 12, transverse structural members 13, a deck 14, axles 15 and flanged wheels 16 mounted on the axles. The car travels on rails 17 supported on the charging floor 18 in front of an open hearth furnace 19, which has a door 20. The car also has end walls 21 and 22, a side wall 23 adjacent the furnace, and a side wall 24 remote from the furnace. The two end walls 21 and 22 carry stiffeners 25 and cover plates 26 outside the stiffeners (FIGURE 6). The walls and deck form a hopper for receiving a load of scrap material. Preferably the side wall 23 has a movable section 27 mounted on a torque bar 28 to relieve jams which may occur if the hopper is overloaded. Preferably the end wall 21 carries a buffer 29 for absorbing shocks as material is dumped into the hopper.

Figure 3:
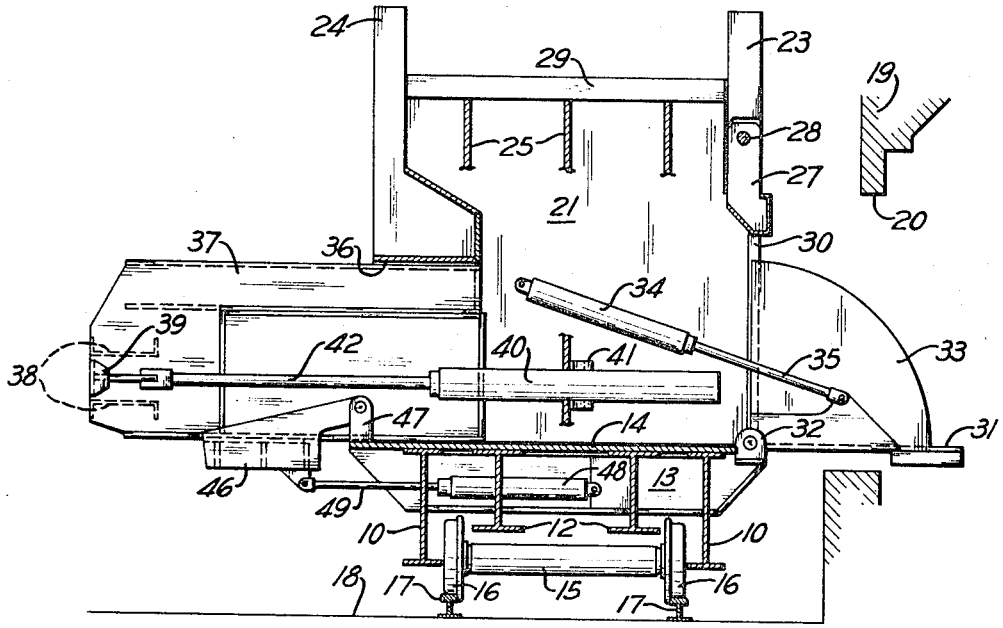
FIGURE 3 is a vertical section similar to FIGURE 2, but showing the stiffeners broken away and the parts positioned to receive a load of scrap material.
Figure 4:
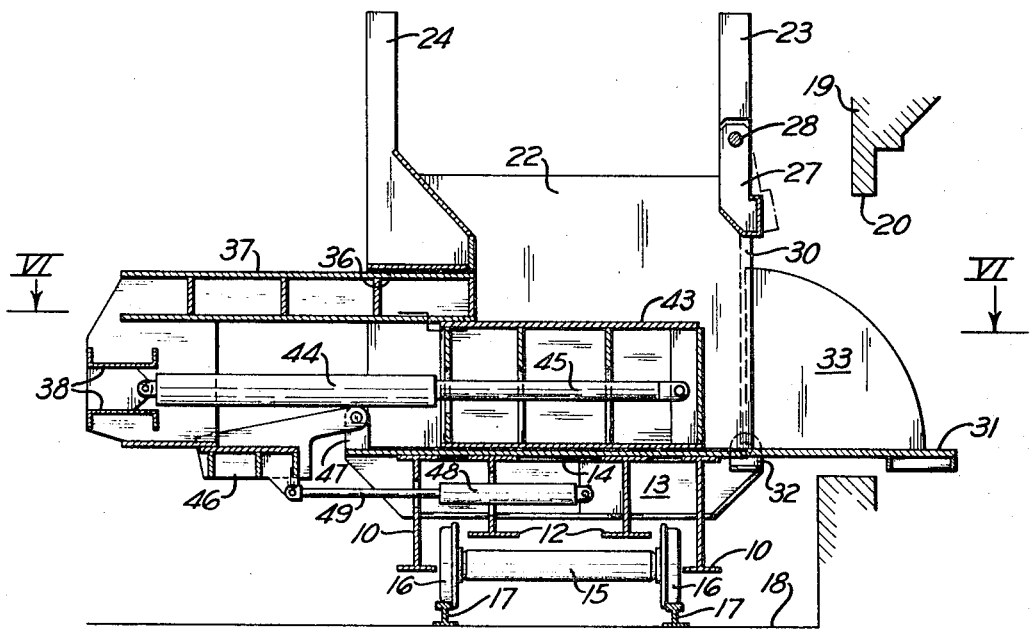
FIGURE 4 is a vertical section on line IV—IV of FIGURE 1 showing the parts positioned to work the scrap material into a furnace.
Figure 5:
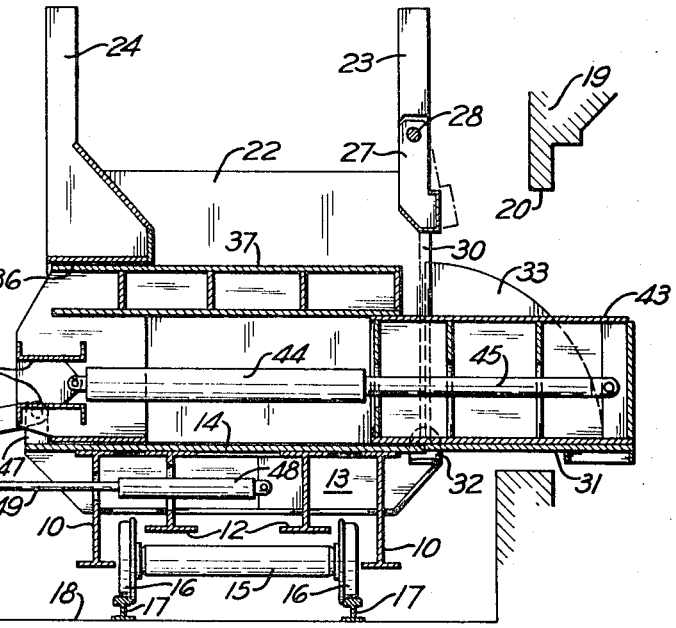
FIGURE 5 is a vertical section similar to FIGURE 4, but showing the parts in their final clean-up position.

The side wall 23 has an opening 30 below its movable section 27. An apron 31 is pivoted on brackets 32 at the lower edge of opening 30. The apron can move between a raised position in which it closes the opening 30 (FIGURE 2) and a lowered position in which it forms a continuation of the deck 14 and projects into the furnace door 20 (FIGURES 3, 4 and 5). The apron has arcuate end plates 33, which lie outside the end walls 21 and 22. For moving the apron between its two positions, I pivot double-acting fluid pressure cylinders 34 to the respective end walls 21 and 22 and pivot the piston rods 35 thereof to the apron. The stiffeners 25 are suitably recessed to accommodate plates 33, cylinders 34 and piston rods 35. When the piston rods are retracted, the apron is raised; when the piston rods are projected, the apron is lowered.

The other side wall 24 has an opening 36. An outer ram 37 of inverted L-shape in end elevation (FIGURE 3) is slidably mounted on the deck 14 to move in and out through the opening 36. The outside face of the ram carries a pair of vertically spaced back-to-back channels 38. Plates 39 are welded between the end portions of the two channels, and the ends of these plates overhang the side edges of the ram (FIGURE 6). I mount double-acting fluid pressure cylinders 40 on trunnions 41 fixed to stiffeners 25 outside the respective end walls 21 and 22. Cylinders 40 have piston rods 42 which I attach to the overhanging ends of plates 39. When the piston rods 42 are retracted, the outer ram lies within the confines of the hopper (FIGURE 2); when these rods are projected, the outer ram moves out of the hopper through the opening 36 (FIGURES 3, 4 and 6).

A box-like inner ram 43 is slidably mounted on the deck 14 within the outer ram 37. The inner ram is of the same width as the outer ram but of less height. I attach a double-acting fluid pressure cylinder 44 to the inside of channels 38 intermediate their length, and attach the piston rod 45 thereof to the inner ram. When the piston rod 45 is retracted, the inner ram 43 lies within the confines of the outer ram (FIGURE 3); when the piston rod 45 is projected, the inner ram moves out of the ram toward the side wall 23 (FIGURES 4, 5 and 6). It should be noted that the inner ram moves with the outer ram when cylinders 40 are actuated.

Preferably I pivot a "steady rest" 46 to brackets 47 on the deck 14. I pivot another double-acting fluid pressure cylinder 48 to one of the structural members 13 under the deck and pivot the piston rod 49 thereof to the "steady rest." When the piston rod 49 is retracted, the "steady rest" extends downwardly out of the way (FIGURE 2); when the piston rod is projected, the "steady rest" moves upwardly to assist in supporting the rams 37 and 43 (FIGURES 3 and 4). The outer and intermediate structural members 10 and 12 are suitably recessed to accommodate cylinder 48 and piston rod 49.

Figure 1:
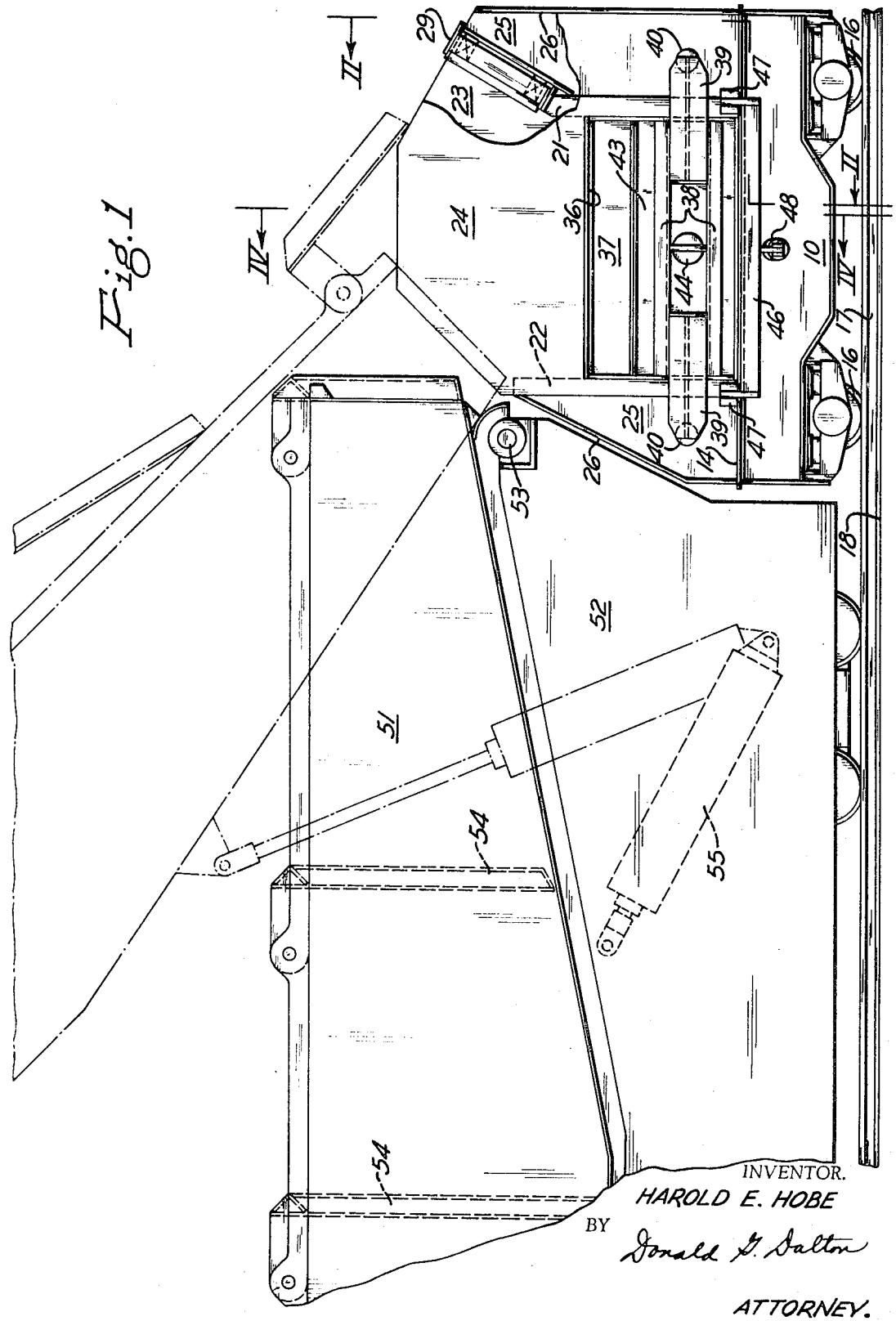
FIGURE 1 is a side elevational view of my charging machine.

I may use any suitable means for loading scrap material into the hopper. For this purpose I have illustrated a scrap box 51 pivoted to another car 52 on a horizontal axis 53 (FIGURE 1). Car 52 can be coupled to the rear of the car of my charging machine. One or more hinged partitions 54 divide the box into a series of compartments which receive scrap. The car is equipped with a double-acting fluid pressure cylinder mechanism 55 for raising and lowering the box 51 about its axis 53.

Figure 2:
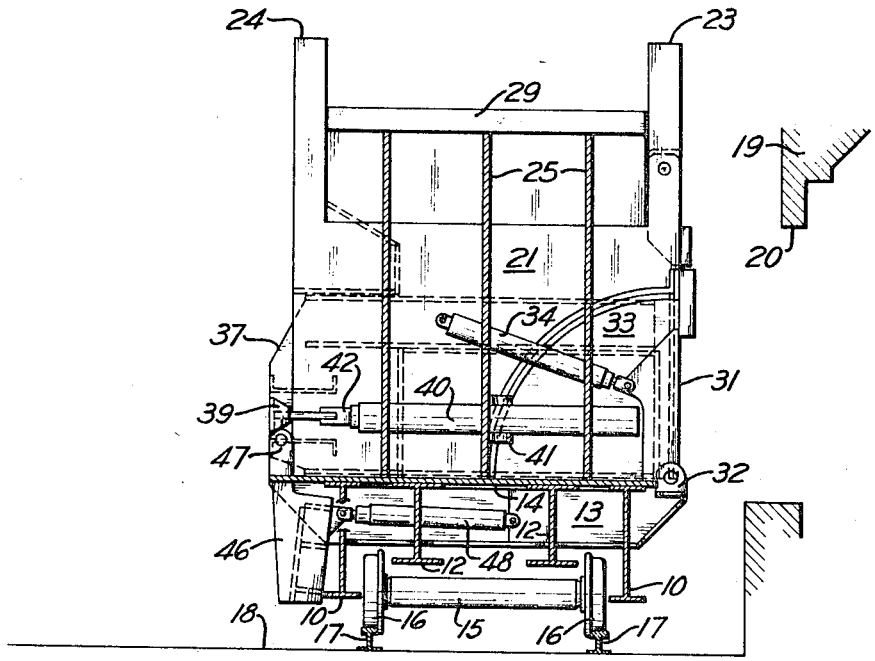
FIGURE 2 is a vertical section on line II—II of FIGURE 1 showing the parts retracted.

In operation, I actuate cylinders 34, 40, 44 and 48 to retract their piston rods 35, 42, 45 and 49 to move the parts to the position shown in FIGURE 2 when the machine is not in use or to transfer it to another location. When I wish to load scrap material into the hopper, I position the machine in front of a door 20 of furnace 19, and actuate cylinders 34, 40 and 48 to project their piston rods 35, 42 and 49. This projects the apron 31 into the door, moves the two rams 37 and 43 through the opening 36 in the side wall 24 out of the hopper, and raises the "steady rest" 46, as shown in FIGURE 3. I actuate cylinder 55 to raise the scrap box 51 and thus dump scrap material into the hopper. Alternatively I can use other means, such as a mganetic crane, to load the hopper. Next I actuate cylinder 44 to project its piston rod 45 and the inner ram 43, as shown in FIGURE 4. This pushes scrap material from the hopper across the apron 31 into the furnace 19. Finally I actuate cylinders 40 to retract their piston rods 42, as shown in FIGURE 5. This pulls the rams 37 and 43 back into the hopper to clear the hopper and apron of the remaining scrap. Before moving the machine, I actuate cylinders 34 and 44 to raise the apron and retract the inner ram.

From the foregoing description, it is seen that my invention affords a simple compact machine for charging scrap to an open hearth furnace. The machine effectively distributes the scrap within the furnace as the two rams push it from the apron. In the interest of simplicity, I have not shown the connections for admitting fluid to the various cylinders, but it is to be understood that any suitable conventional means may be included.

I claim:

1. A scrap charging machine comprising a car, a hopper on said car having a deck, side walls and end walls, said side walls having openings, an apron pivoted to the car below one of said openings and having a raised position in which it closes the opening and a lowered position in which it forms an extension of said deck, an outer ram supported on said deck and having a first position in which it lies within the hopper and a second position in which it projects through the other opening, an inner ram supported on said deck and having a first position within said outer ram and a second portion extending therefrom toward said apron, and fluid pressure means connected to said apron and rams for moving them to their different positions.

2. A machine as defined in claim 1 in which said outer ram is of inverted L-shape to receive said inner ram.

3. A machine as defined in claim 2 in which said fluid pressure means includes cylinders pivoted to the outside of said end walls and having piston rods connected to said apron, cylinders mounted outside said end walls and having piston rods connected to said outer ram, and a cylinder within said outer ram and being connected thereto and having a piston rod connected to said inner ram.

4. A machine as defined in claim 1 further comprising a "steady rest" pivoted to the car below the opening on the side opposite said apron, and fluid pressure means connected to said "steady rest" for moving it between a lowered position where it is out of the way and a raised position where it assists in supporting said rams when said outer ram is in the second position.

5. A machine as defined in claim 1 in which one of said side walls has a movable section above its opening, and a torque bar supporting said section.

References Cited
UNITED STATES PATENTS 2,679,325    5/1954    Smith.
3,349,931    10/1967    Wagner _____ 214—82

ROBERT G. SHERIDAN, *Primary Examiner.*

U.S. Cl. X.R.

214—30, 82